INVENTORS
EARL R. THOMPSON
FRANKLIN D. LEMKEY
BY Richard N. James
ATTORNEY

LIQUIDUS SURFACE OF Co-Cr-C SYSTEM

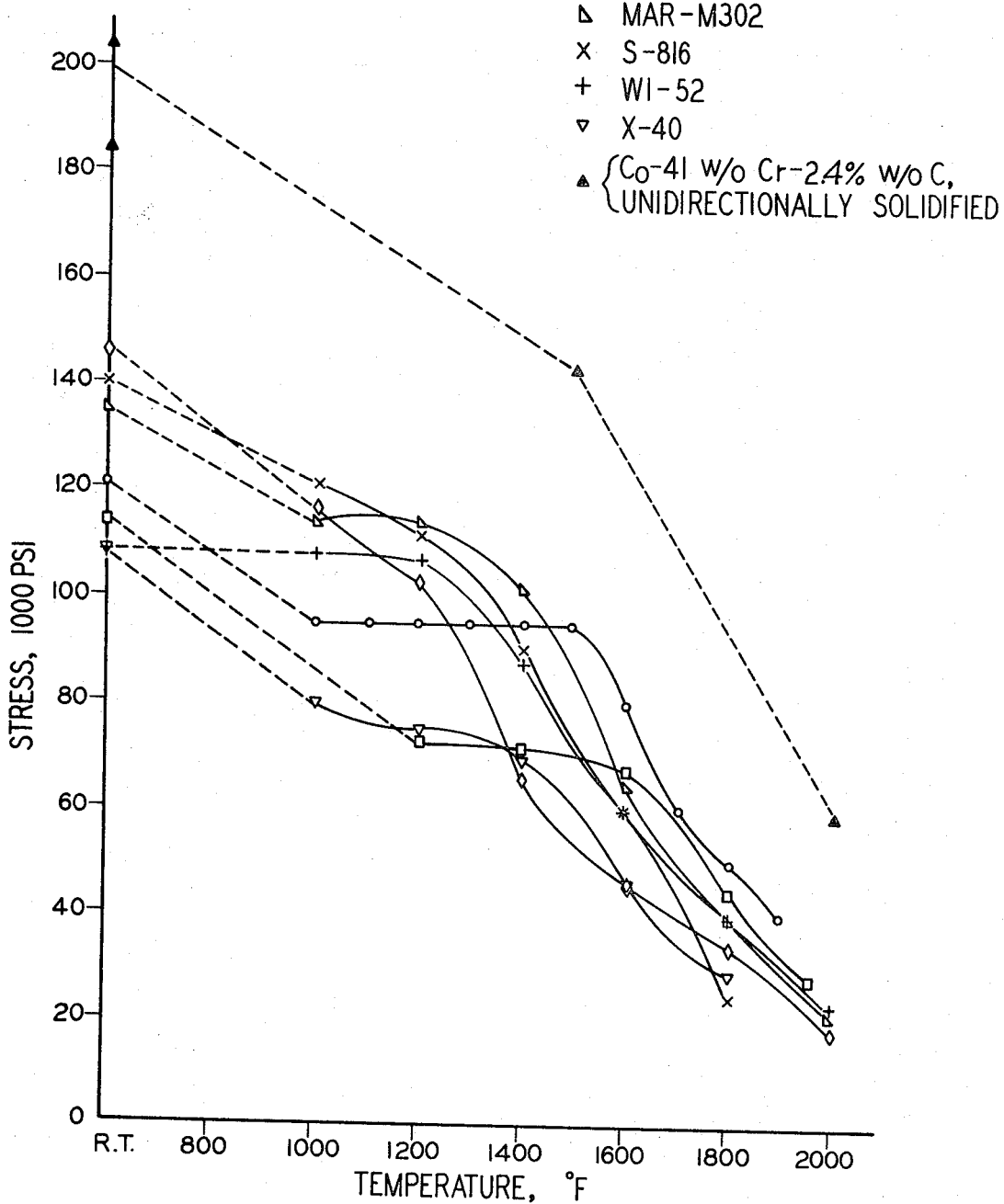

MONOVARIANT EUTECTIC SYSTEM NiAl-Cr

United States Patent Office 3,564,940
Patented Feb. 23, 1971

3,564,940
ANISOTROPIC POLYPHASE STRUCTURE OF MONOVARIANT EUTECTIC COMPOSITION
Earl R. Thompson and Franklin D. Lemkey, Glastonbury, Conn., assignors to United Aircraft Corporation, East Hartford, Conn., a corporation of Delaware
Filed June 5, 1968, Ser. No. 734,821
Int. Cl. C22c *19/00*
U.S. Cl. 75—134
17 Claims

ABSTRACT OF THE DISCLOSURE

Monovariant eutectic compositions of matter are unidirectionally solidified to provide an anisotropic structure wherein one phase of a whisker or lamellar morphology in substantial alignment is embedded in a matrix phase. Included in the systems described are alloys of nickel or cobalt of monovariant ternary eutectic composition which may be solidified to form structures with high strength whiskers embedded in a nickel or cobalt-base matrix.

BACKGROUND OF THE INVENTION

The present invention relates in general to those materials characterized as monovariant eutectic compositions and more particularly, to such compositions as unidirectionally solidified into anisotropic structures.

In particular embodiments this invention relates to the high temperature alloys, particularly the nickel-base and cobalt-base alloys having utility in gas turbine engine applications.

The capabilities of the current nickel and cobalt-base superalloys are being severely taxed in the advanced gas turbine engines since they are exposed to high stress levels at temperatures in excess of 85 percent of their melting points. While the performance and endurance of these alloys have been improved by design techniques such as air cooling and by manufacturing techniques such as unidirectional solidification, such measures offer only interim solutions to the basic problem.

It is known that a number of alloys, principally the eutectics, may be directionally solidified from a melt to form an ordered microstructure wherein one phase solidifies in whisker or lamellar form in a matrix of a second phase. A number of eutectics of this nature and the techniques to produce in situ whisker or lamellae-strengthened alloys are described in the patent to Kraft, 3,124,452, which shares a common assignee with the present invention.

Fiber strengthened composites may be particularly attractive for gas turbine engine use when the melting points of the respective phases are high and the reinforcing fibers are strong. While a number of materials are contemplated as the fibrous reinforcement in articles of this nature, the carbides are particularly attractive since their melting points and strengths are generally high and they are subject to very little degradation in strength at the temperatures associated with gas turbine engine operation.

In a copending application entitled "Monocarbide Reinforced Eutectic Alloys and Articles," Ser. No. 674,607, by the present inventors and assigned to the present assignee, there is disclosed a class of alloys distinguishable as pseudo-binary eutectic compositions between nickel, cobalt or chromium and a monocarbide of titanium, zirconium, hafnium, vanadium, niobium or tantalum, particularly with the alloy directionally solidified to form an ordered microstructure wherein a predominantly carbide phase is embedded in a metal matrix. Of similar particular interest in gas turbine engine applications are a number of the materials of monovariant eutectic composition based on the intermediate phases, representative alloys including certain of those in the nickel-aluminum-chromium system hereinafter identified generally as NiAl-Cr.

Studies of various compositions in the nickel-chromium-aluminum system were reported as early as 1952 in an article entitled "The Constitution of Nickel-Rich Alloys of the Nickel-Chromium-Aluminum System," Taylor et al., Journal Institute of Metals, 81, pp. 451–464 (1951–53). In investigating the nickel-rich corner of the ternary system along the NiAl-Cr conode, eutectiferous behavior was noted and the eutectic composition was postulated. A composition triangle was defined which is, in essence, a self-contained ternary eutectic system in which the participating phases are the solid solution based on nickel, nickel aluminide (NiAl) and chromium. Subsequent researchers have revised the values of the eutectic composition originally reported, and the eutectic composition has been previously utilized in preparing directionally solidified specimens.

However, a disadvantage to the usual binary eutectic or pseudo-binary eutectic approach in the production of composites by directional solidification techniques has been the lack of versatility of these systems. For a given class of materials in the eutectic composition, the volume fraction and composition of the phases are fixed by the uniqueness of the invariant equilibrium. Accordingly, since no significant variation in the volume fraction or composition of the phases is possible during equilibrium freezing, the total number of those alloys having all of the requisite characteristics or optimum properties for a specific use, such as a gas turbine engine component, is limited. This will be evident when it is understood that, in a typical gas turbine alloy article formed from a fiber-strengthened composite, a high volume fraction of fiber is desirable from a strength standpoint in a matrix composition providing not only reasonable strength but also good high temperature oxidation, sulfidation, erosion and thermal shock resistance. These criteria, which are a few of many criteria imposed on alloys of this nature, immediately eliminate the vast majority of the eutectic systems for these advanced applications.

SUMMARY OF THE INVENTION

The invention herein described relates to aligned polyphase structures formed from that class of compositions which solidify according to the monovariant eutectic reaction. At a fixed pressure these compositions are monovariant thermodynamically and involve, in ternary systems for example, the three phase equilibrium between the melt and two solids over a temperature and composition range and not, as in the binary or pseudo-binary systems, at a fixed temperature and composition. The common and distinguishing feature of the compositions of the present invention is that they are in each case located on a eutectic trough such as exists in some phase diagrams, as hereinafter explained in detail.

Particularly useful products of the present invention comprise composites having an aligned fibrous or lamellar phase which serves as the reinforcement for a matrix consisting of a nickel-base or cobalt-base solid solution, or an intermediate phase, such as the nickel aluminides.

In a preferred embodiment composites formed according to the present invention consist of an aligned fibrous or lamellar phase of a carbide or mixed carbide in a nickel or cobalt-base solid solution matrix, the composites being the result of the unidirectional solidification of a melt corresponding to the monovariant ternary eutectic composition. Included in those alloy compositions of particular interest are the ternary alloys of nickel or cobalt with two face-centered cubic monocarbides including those of niobium, tantalum, titanium, vanadium, zirconium and hafnium. Also included are those compositions comprising the ternary alloys of nickel or cobalt with chromium and with carbon or a face-centered cubic monocarbide.

For gas turbine engine applications the directionally solidified monovariant eutectic compositions of the cobalt-chromium-carbon system are of particular interest. These alloys will generally consist of, by weight, about 35–45 percent chromium, 2.6–2.2 percent carbon, balance essentially cobalt, the alloy which has been characterized most extensively having a nominal composition, by weight, of about 41 percent chromium, 2.4 percent carbon, balance cobalt. As solidified, the composite formed from this alloy comprises a cobalt matrix with about 30 weight percent chromium in solid solution and an aligned dispersed fibrous carbide $(Cr, Co)_7C_3$, the carbide phase occupying about 31 volume percent in the composite structure.

In another preferred embodiment the monovariant eutectic compositions in the nickel-aluminum-chromium system are subjected to plane front solidification at slow rates to provide an aligned microstructure consisting of chromium rods reinforcing a nickel aluminide matrix. The compostions residing on the eutectic trough displaying the morphological habit of in situ whisker or lamellar growth extend from the composition, in atomic percent, 29.8 nickel, 36.6 aluminum and 33.6 chromium, to the composition 35.2 nickel, 29.1 aluminum and 35.7 chromium. As a result of the latitude in choosing monovariant compositions along the trough between NiAl and Cr, a unique capability of changing the morphology of the reinforcing phase exists. It is possible to alter the volume fractions of the phases as well as their compositions. By so doing the whisker morphology can be stabilized at lower volume fractions $\leqslant .34 \pm .2$ and the lamellar morphology at higher volume fractions.

In the higher order systems displaying the monovariant eutectic behavior as in the ternary systems, the number of solids forming from the melt will be $n-1$, where $n$ is the number of components in the system.

BRIEF DESCRIPTION OF THE DRAWINGS

FIG. 3b is an isopleth taken along the dotted lines of FIG. 3a;

FIG. 6 is a graph demonstrating the tensile strength of the directionally solidified Co-41% Cr-2.4% C composite as compared to a number of representative conventional superalloys;

DESCRIPTION OF THE PREFERRED EMBODIMENTS

As previously mentioned, the present invention is concerned with increasing the range of composition over which an aligned polyphase composite can be achieved with in situ fiber formation by plane front solidification of a given materials system. It is not to be confused with the unidirectional solidification of a melt near the true eutectic composition wherein the possibility of increasing the volume fraction of the dispersed phase exists if either the proeutectic dendrites are controllable or shifting of the eutectic reaction is permitted by non-equilibrium freezing conditions.

The present approach involves the solidification of a melt which freezes according to the monovariant eutectic reaction. The monovariant eutectic reaction will be understood to have reference to those systems wherein $n-1$ phases solidify simultaneously from the liquid of an $n$ component system. This is to be distinguished from the invariant eutectic reaction which refers to the isothermal and simultaneous crystallization of $n$ phases in an $n$ component system.

Figure 3A:
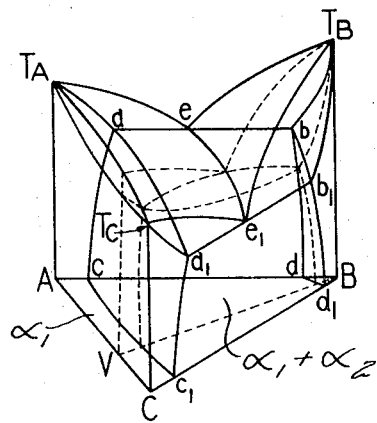
FIG. 3a is a space model phase diagram illustrating the existence of the eutectic trough, $e-e_1$, in a monovariant ternary eutectic system.
Figure 3B:
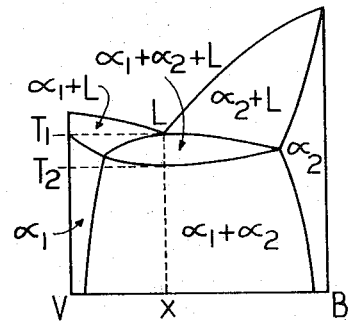

Accordingly, the present approach is applicable to the directional solidification of a melt whose composition corresponds to that at the eutectic trough of some phase diagrams such a trough being illustrated, for example, by the line $e-e_1$ of the model ternary diagram of FIG. 3a, which shows a three phase region passing continuously from one binary eutectic horizontal to the other along the line $e-e_1$. The vertical section or isopleth indicated by the dotted lines in FIG. 3a is reproduced in FIG. 3b. A liquid of composition X will solidify over the temperature range $T_1$ to $T_2$.

Figure 3C:
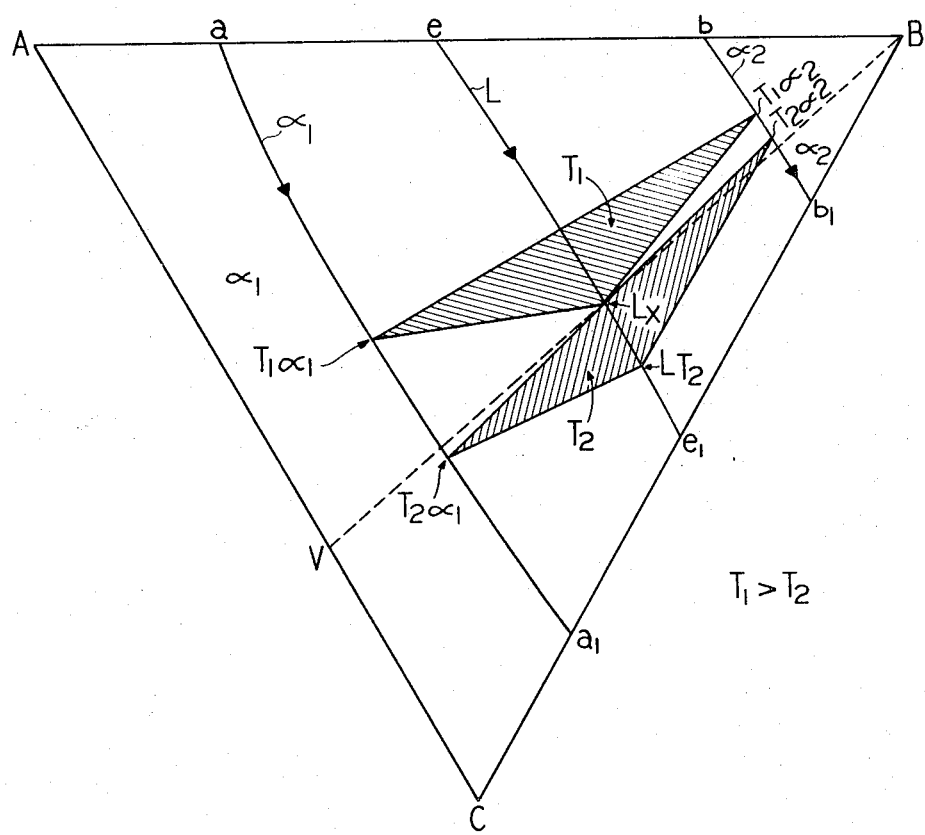
FIG. 3c is a projection of the eutectic trough and the solubility curves on the basal triangle.

The equilibrium solidification of composition X may be conveniently described by referring to FIG. 3c which is a projection of the eutectic trough and the solubility curves on the basal triangle. Also shown are the tie triangles whose vertices indicate the composition of the liquid and two solid phases in equilibrium. At each temperature level there is a tie triangle. These triangles reduce to the eutectic horizontal in the terminal binary phase diagrams. For the solidification of composition X only the tie triangles corresponding to the beginning of freezing, $T_1$, and the termination of freezing, $T_2$, have been shown in FIG. 3c. There are in fact a continuous series of tie triangles between these temperatures. During freezing, adjustments of the liquid and the two solid compositions are made along the eutectic trough and solubility curves, respectively, until at $T_2$ the last liquid to freeze is of composition $L_{T2}$ and the solid phase compositions have shifted from $T_1\alpha_1$, to $T_2\alpha_1$, and $T_1\alpha_2$ to $T_2\alpha_2$.

With reference to FIG. 3a, solidification of a melt whose composition lies along the trough $e-e_1$, will result in the two phase separation of $\alpha_1+\alpha_2$ from the liquid. The composition of the $\alpha_1$ phase may thus be varied from $a$ to $a_1$, at the eutectic temperature, and from $c$ to $c_1$ at room temperature. The composition of the conjugate $\alpha_2$ phase, on the other hand, varies in dependence upon the composition of the $\alpha_1$ phase. The amount of each phase present is variable and can be calculated on a tie line utilizing the lever rule. Accordingly, as used herein, the term "monovariant ternary eutectic reaction" is utilized to describe the above-mentioned reaction associated with compositions located on the eutectic trough of the ternary phase diagram. This reaction will be distinguished from the ternary eutectic reaction which describes the four phase reaction of the type $L=\alpha+\beta+\gamma$ with which we are not here concerned although, loosely speaking, the present reaction may be referred to as a eutectic-type reaction.

A number of specific systems which demonstrate the ability to form aligned polyphase composite structures by solidification via the monovariant eutectic reaction have been investigated. Certain of the more promising alloy systems are described in detail.

Figure 5:
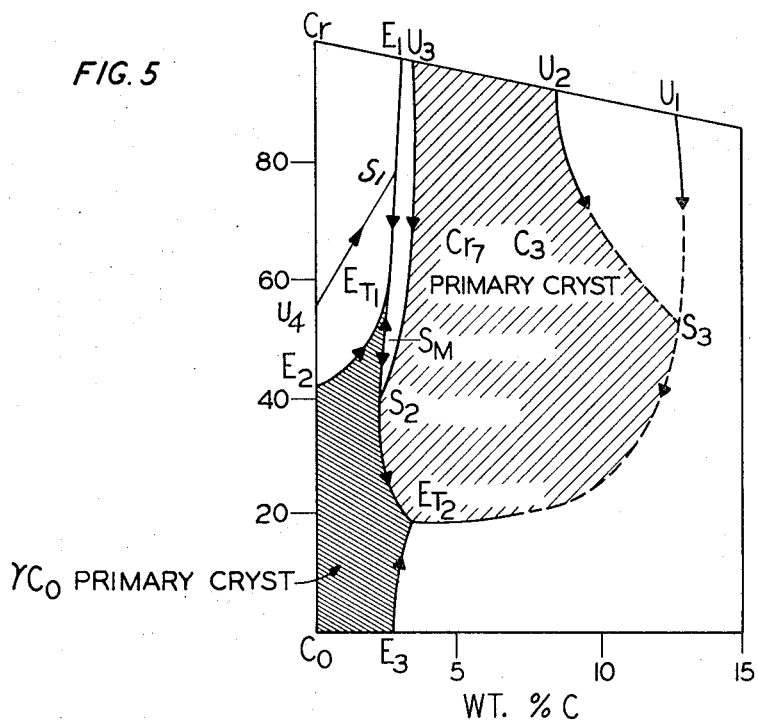
FIG. 5 is a liquidus diagram for the Co-Cr-C systems.

The cobalt-chromium-carbon system, which appears to have significant utility in gas turbine engine applications, exhibits two ternary eutectics which correspond to the compositions, by weight, Co-57% Cr-2% C and Co-19% Cr-3.5% C, respectively (FIG. 5). The $E_{T1}$ eutectic reaction, $L=\gamma$ cobalt solid solution+sigma $CrCo+(Cr,Co)_{23}C_6$ occurs at 2435° F. and results in a product having a brittle matrix phase. The $E_{T2}$ eutectic solidifies at 2245° F. according to the reaction $L=\gamma$ cobalt solid solution+$(Cr,Co)_7C_3$+C. A eutectic trough exists between the composition Co-41% Cr-2.4% C, labelled $S_2$ which is the liquid boundary point of a quasi-peritectic reaction on the liquidus diagram of FIG. 5 and the ternary eutectic $E_{T2}$, and, along this trough, solidification takes place according to the monovariant ternary eutectic reaction $L=\gamma$ cobalt solid solution+$(Cr,Co)_7C_3$.

It has been shown that, contrary to previous investigation, the quasi-peritectic reaction occurs at a higher chromium content and that alloys of a composition, including and between the compositions, by weight, Co-45% Cr-2.2% C and Co-35% Cr-2.6% C, freeze according to the monovariant ternary eutectic reaction and respond to directional solidification to form an aligned fibrous carbide phase dispersed in a cobalt solid solution matrix. The alloy which has been most extensively investigated in this system has a chemistry of Co-41% Cr-2.4% C with a freezing point from the melt beginning at about 2370° F. (1300° C.). In the composite form, the matrix at this composition is a solid solution analyzing at about, by weight, 30% chromium, 0.1% carbon, balance cobalt, and the composition of the carbide phase is approximately 28% cobalt, 6.5% carbon, balance chromium. This alloy composition has a density measured at about 8 grams per cubic centimeter.

Figure 1:
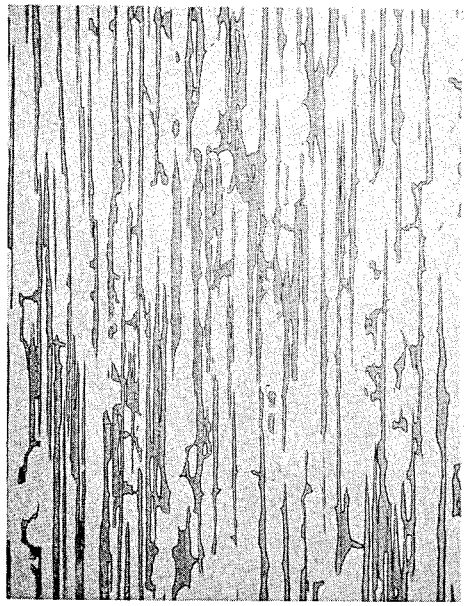
FIG. 1 is a photomicrograph of a directionally solidified Co-41% Cr-2.4% C composite taken longitudinally with respect to its axis of solidification ($\times 500$)
Figure 2:
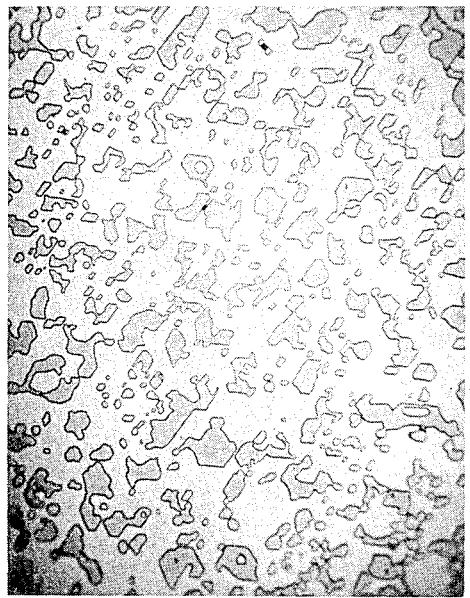
FIG. 2 is a photomicrograph of the same alloy taken transverse to the axis of solidification ($\times 1300$)

The preparation of the composite with the desired anisotropy is accomplished by the directional casting techniques as described by Kraft, supra; VerSnyder 3,260,505; and others, with the solidification parameters selected to provide macroscopically plane front growth, successful solidification having been achieved over at least the range of 2–20 cm./hr. As may be seen in FIGS. 1 and 2, the microstructure provides the carbide phase in fibrous form although with a generally non-uniform cross section at the preferred composition. The phase alignment, however, is evident and the carbide phase may be seen to occupy about 31 volume percent of the microstructure. As used in connection with this alloy and as used throughout the descriptive material, the composite type of structure as illustrated is referred to as fibrillar with the reinforcing carbide phase referred to as fibrous or as fibers. The terms fibrous and fibers will, accordingly, be understood to encompass in scope both the whisker and lamellar forms of the reinforcing phase.

The manner of growth of the carbide phase and its characteristics were ascertained by extraction of the whiskers from the ingot by dissolution of the matrix in alcoholic bromine. The individual fibers displayed whisker properties (i.e. elastic strain in excess of 2.5% before failure). Morphologically the carbide needles grow from one webbed area, where several needles are joined, for some distance to another webbed area.

It will be noted also that the high chromium content of this alloy should provide a good measure of oxidation-sulfidation resistance thereto. In fact, the chromium content of this alloy is almost coincident with the optimum chromium content for the cobalt-base superalloys having maximum oxidation resistance. At 900° C. in flowing oxygen, the weight gain per unit area for the alloy test specimens at this composition was 0.5 milligram per square centimeter after 1000 minutes.

Since this particular alloy includes elements which have characteristics useful in gas turbine engine applications, a detailed study was made of its properties. Directionally solidified specimens were tested in tension at both room temperature and at a number of elevated temperature levels and the reinforcing character of the carbide in the composite was clearly demonstrated, the tests including examples wherein the stresses were exerted both parallel and transverse to the axis of the fibers. Representative data from these tests is set forth in the following tables.

TABLE I.—TENSILE PROPERTIES OF Co-41% Cr-2.4% C.

| Test temperature, ° F. | Tensile strength, p.s.i. | Modulus of elasticity, p.s.i.[1] | Percent strain | Comments |
|---|---|---|---|---|
| 75 | 57,300 | 27×10⁶ | 2.7 | Alloy approximating matrix composition. |
| 75 | 125,500 | | | Conventionally cast. |
| 75 | 204,800 | 39.9×10⁶ | 1.7 | Longitudinal test. |
| 75 | 202,000 | 48.6×10⁶ | 1.6 | Longitudinal test. Water quenched after 2,000° F. heat treatment. |
| 75 | 185,300 | 40×10⁶ | 0.74 | Longitudinal test. Plastically cycled to determine modulus. |
| 75 | 105,100 | | | Transverse test. |
| 75 | 115,100 | | | Do. |
| 1,500 | 138,600 | | 4.0 | Longitudinal test. |
| 1,800 | 73,000 | | | Do. |
| 1,800 | 78,600 | | 1.8 | Do. |
| 2,000 | 58,600 | | 5.1 | Do. |
| 2,200 | 26,600 | | 2.7 | Do. |
| 2,200 | 7,400 | | 21 | Transverse test. |

[1] Dynamic modulus, room temperature: 37×10⁶ p.s.i., 1,600° F.: 27×10⁶ p.s.i.

NOTE.—Longitudinal test—aligned with carbide phase.

TABLE II.—STRESS-RUPTURE DATA FOR Co-(Cr,Co)₇C₃ DIRECTIONALLY SOLIDIFIED TESTED IN AIR TEMPERATURE ° F.

| Temperature, ° F. | Stress, p.s.i. | Time to rupture, hours | Percent elongation at failure |
|---|---|---|---|
| 1,800 | 20,000 | 753.2 | 3 |
| 1,800 | 25,000 | 185.7 | 3 |
| 1,800 | 30,000 | 33.4 | |
| 1,900 | 15,000 | 347.0 | 7 |
| 1,900 | 19,100 | 106.2 | 7 |
| 1,900 | 20,000 | 49.1 | 6 |
| 2,000 | 10,000 | 307.1 | 6 |
| 2,000 | 15,000 | 47.5 | 4 |
| 2,000 | 17,500 | 20.8 | 6 |
| 2,000 | 20,000 | 4.4 | 3 |

Figure 7:
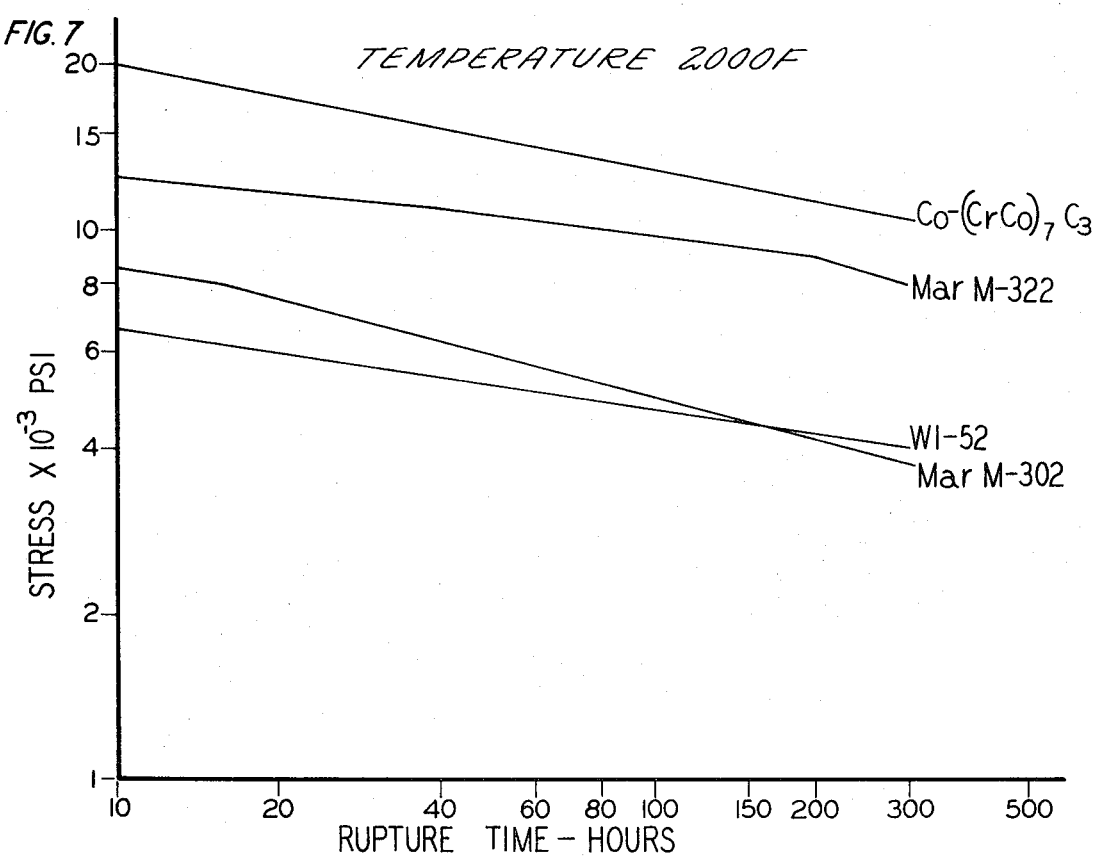
FIG. 7 is a graph comparing the rupture life of the Co-41% Cr-2.4% C composite at 2000 F. to several representative competitive materials.

As shown in the preceding data and illustrated in FIG. 6, this alloy exhibits an average tensile strength at room temperature of 190,500 p.s.i. with an average failure strain of 0.015. The significant increase in tensile strength over the current commercially available cobalt-base superalloys is apparent and, as demonstrated in FIG. 6 and in the stress-rupture graph of FIG. 7, the strength advantage is maintained at conditions of elevated temperature. At room temperature, the elastic modulus of the alloy is about 37×10⁶ p.s.i. which compares favorably with the reported elastic moduli for the various cobalt-base superalloys, which are typically in the range of 30–36×10⁶ p.s.i.

Since the physical properties of the described alloy proved so faporable, tests were conducted to solidify the material into a variety of simple shapes such as cylindrical bars and also into the more complex shapes which more closely correspond to the configurations required for gas turbine engine hardware. Accordingly, the alloy was directionally solidified into a turbine blade configuration and a close examination of this blade showed essentially no divergence of the carbide whiskers from the preferred direction of growth in the airfoil section.

The nickel-chromium-carbon system was similarly investigated. This system exhibits two ternary eutectics which correspond to compositions of, by weight, Ni-67%

Cr-1% C and Ni-20% Cr-3.5% C, respectively. The former eutectic freezes at 2320° F. according to the reaction L=γ nickel solid solution+α chromium solid solution+$Cr_{23}C_6$, and the latter solidifies at 1915° F. according to the reaction L=γ nickel solid solution +$Cr_3C_2$+C. A maximum (2380° F.) in the melting temperature of the compositions lying in the trough between the two eutectics occurs at the composition Ni-32% Cr-2.2% C. This composition, unidirectionally solidified, was found to contain dendrites of carbide. The composition Ni-32% Cr-1.7% C, however, solidified at 1.9 cm./hr. according to the monovariant ternary eutectic reaction L=γ nickel solid solution+$Cr_7C_3$. The structure contained approximately 20 volume percent of the $Cr_7C_3$ phase as an aligned fibrous dispersion in a nickel solid solution matrix.

It is known that many face-centered cubic monocarbides are mutually soluble in all proportions, such carbides including those of niobium, tantalum, titanium, vanadium, zirconium, and hafnium. It has also been shown that these same carbides from pseudo-binary eutectics with nickel and with cobalt. The ternary composition between one of these metals and two of the monocarbides has now been shown to exhibit a monovariant ternary eutectic reaction in the composition corresponding to the trough $e-e_1$ of FIG. 3a. The model phase diagram for one of these systems, specifically that of Co-TiC-NbC, is shown in FIG. 4.

Figure 4:
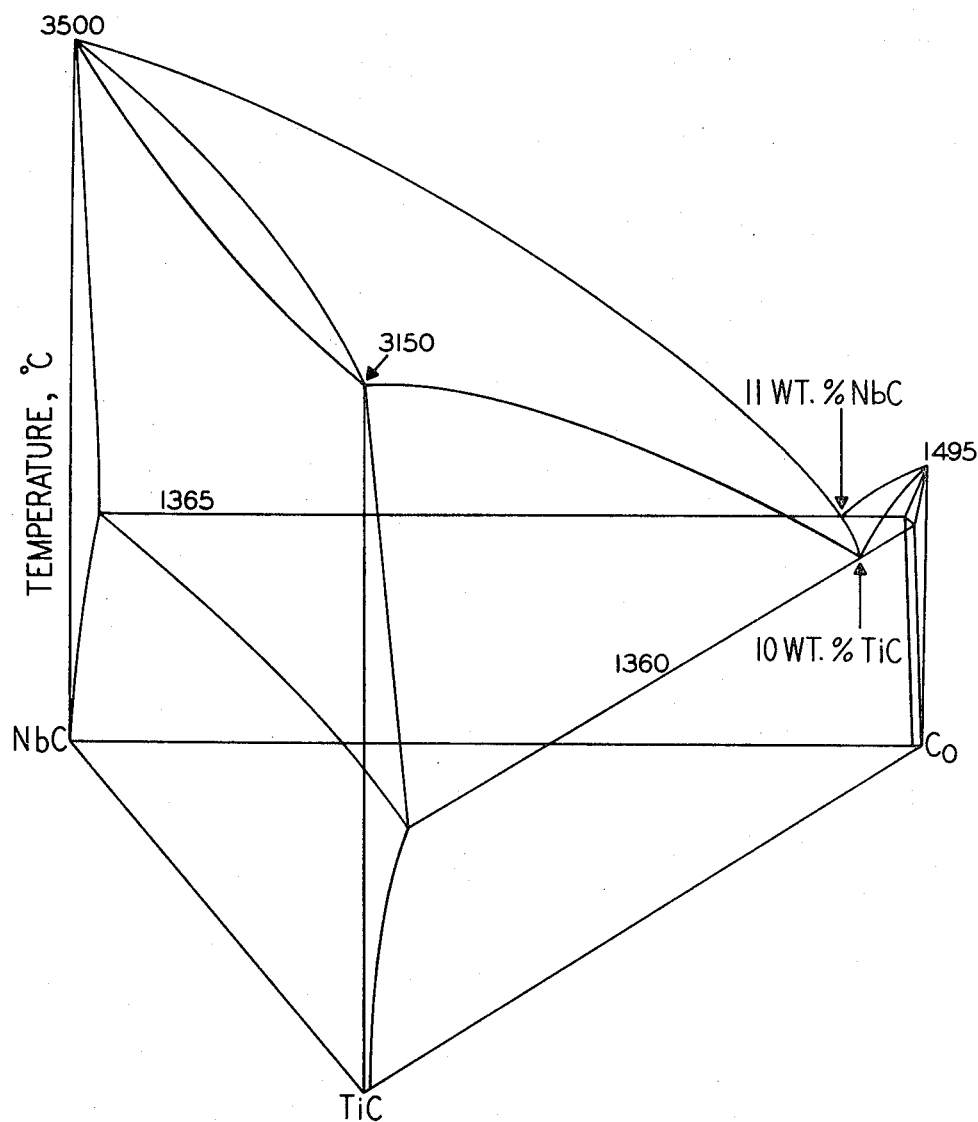
FIG. 4 is a space model phase diagram of the representative Co-TiC-NbC system.

Referring to FIG. 4, it may be seen that binary eutectics between cobalt and niobium carbide and between cobalt and titanium carbide exist at about 11 weight percent NbC and 10 weight percent TiC, respectively. In the construction of the space diagram for this system the eutectic trough may be seen to lie along the path of nearly constant cobalt. Accordingly, an alloy comprising, by weight, 8% NbC, 2% TiC, balance cobalt, was unidirectionally cast in alumina at a solidification rate of 3 cm./hr. Subsequent analysis revealed a two phase eutectic-type microstructure with the phases aligned parallel to the direction of heat flow in the controlled solidification process. The carbide phase was isolated from the matrix by dissolution in alcoholic bromine and the 4/1 relationship of Nb/Ti was confirmed by chemical analysis. Thus, it was again demonstrated that an aligned polyphase composite could be produced in which the composition of the dispersed phase as well as that of the matrix phase could be varied according to the monovariant ternary eutectic reaction. The tensile strength of the composite parallel to the aligned mixed carbide phase was 149,500 p.s.i.

Figure 8:
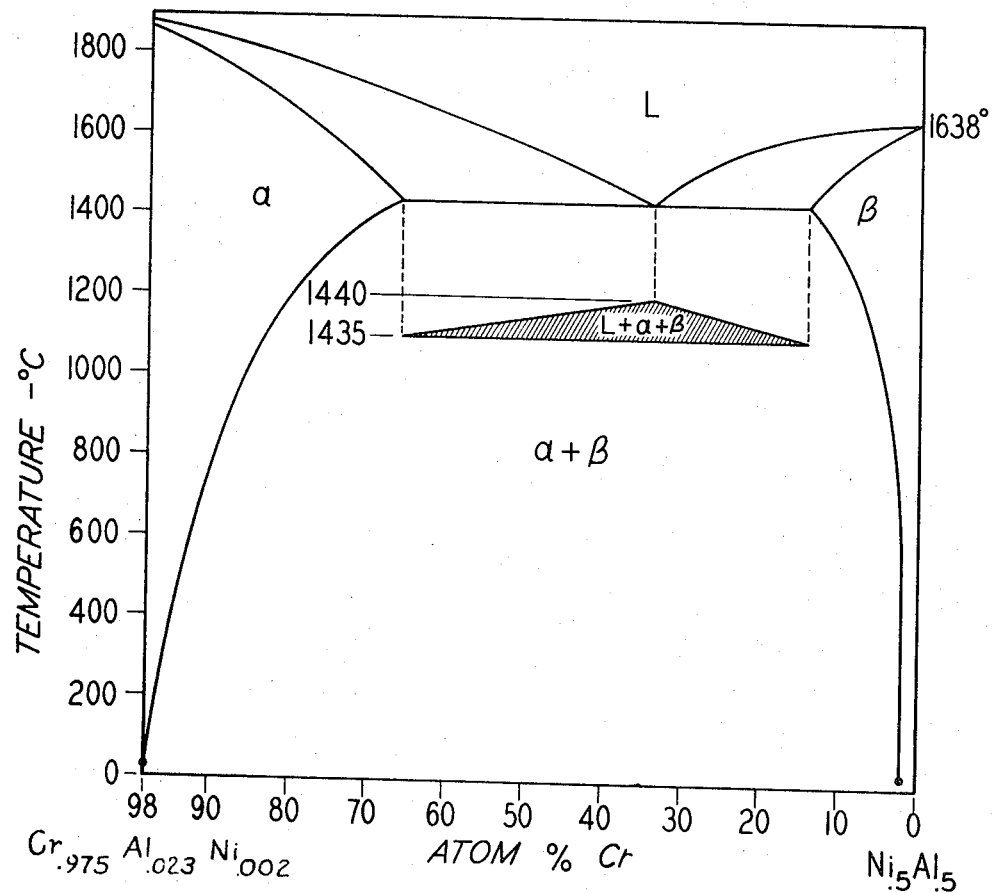
FIG. 8 is a phase diagram of the monovariant eutectic system NiAl-Cr for whisker formation.

Another group of alloys which appear promising in terms of their suitability for use in high temperature oxidizing environments are those of monovariant eutectic composition in the nickel-aluminum-chromium system. Plane front solidification of compositions in the range of from, in atomic percent, 29.8 percent nickel, 36.6 percent aluminum, and 33.6 percent chromium to about 35.2 percent nickel, 29.1 percent aluminum and 35.7 percent chromium has resulted in an aligned microstructure consisting of chromium within a nickel aluminide matrix. The microstructure of those unidirectionally solidified ingots containing aluminum to nickel atom ratios in excess of 1:1 are classically lamellar in morphological habit; those wherein this ratio is equal to or less than 1 are whisker-like. An alloy of, in atomic terms, 32.2 percent nickel, 33.3 percent aluminum and 34.5 percent chromium was found to solidify with a mixed morphology of both lamellae and whiskers of chromium. Thus the selected eutectic trough composition has a profound effect on the morphology and attendant properties of the system. This system is shown in FIG. 8.

Chemical analyses of the extracted chromium phase were performed on a specimen containing, by weight, 42.7 percent nickel, 18.3 percent aluminum and 39.0 percent chromium, and on one containing 41.0 percent nickel, 19.9 percent aluminum and 39.1 percent chromium, the specimens having been rapidly quenched from the melt. These alloys exhibited classic lamellar and whisker-type growth, respectively, after unidirectional solidification. The nickel and aluminum contents soluble in the chromium phase of the former were 13.2 weight percent nickel and 9.3 weight percent aluminum, and in the latter 20.0 weight percent nickel and 9.7 weight percent aluminum. The volume percentage of chromium in these particular alloys was 37.4 and 32.9 for the lamellar and rod-like compositions, respectively.

From a mass balance the chromium soluble in nickel aluminide at approximately 1450° C. was determined to be 17 weight percent for the whisker-like body and 15 weight percent for the lamellar composition. After solidification, the chromium whisker phase contained 0.23 weight percent nickel and 1.2 weight percent aluminum while the nickel aluminide phase had 2.4 weight percent chromium in solid solution. The average composition of the chromium lamellae, on the other hand, was, by weight, 1.2 percent nickel, 4.9 percent aluminum, balance chromium while the coexisting nickel aluminide phase contained 4 weight percent chromium in solid solution. The average composition of the chromium lamellae, on the other hand, was, by weight, 1.2 percent nickel, 4.9 percent aluminum, balance chromium while the coexisting nickel aluminide phase contained 4 weight percent chromium in solid solution.

The results of extensive testing and analysis of the NiAl-Cr alloys are summarized in Tables III and IV.

TABLE III.—NiAl-Cr MECHANICAL TESTS[1], ATMOSPHERE AIR

| Ni, atom/o | Al, atom/o | Cr, atom/o | Temperature °C. | Ultimate tensile strength, p.s.i. | Strain at failure | Comments |
|---|---|---|---|---|---|---|
| 32.6 | 33.5 | 33.9 | 23 | 174,000 | 0.019 | (c) particular whisker microstructure. |
| 32.6 | 33.5 | 33.9 | 23 | 131,000 | 0.04 | (c) transverse to whiskers. |
| 32.6 | 33.5 | 33.9 | 200 | 312,000 | 0.065 | (c) particular whisker microstructure. |
| 32.9 | 33.0 | 34.1 | 400 | 151,000 | 0.105 | (t) particular whisker microstructure. |
| 32.0 | 32.0 | 36.0 | 600 | 90,000 | 0.05 | (c) particular hi chromium, whisker microstructure. |
| 30.8 | 35.2 | 34.0 | 1093 | 38,100 | 0.118 | (t) particular lamellar microstructure. |
| 32.9 | 33.0 | 34.1 | 1093 | 47,300 | 0.023 | (t) particular whisker microstructure. |
| 32.6 | 33.5 | 33.9 | 1200 | 30,500 | 0.14 | (t) partucilar whisker, faint colony microstructure. |
| 32.6 | 33.2 | 34.2 | 1282 | 25,800 | 0.328 | Do. |

[1] Dynamic modulus at room temperature $26.6 \times 10^6$ p.s.i.

NOTE.—(t) tension; (c) compression.

TABLE IV.—NiAl-Cr STRESS RUPTURE TESTS IN AIR

| Ni, atom/o | Al, atom/o | Cr, atom/o | Temperature, °F. | Stress, p.s.i. | Hours to rupture | Final elongation, percent |
|---|---|---|---|---|---|---|
| 32.6 | 33.2 | 34.2 | 2,000 | 15,000 | 40.4 | |
| 32.9 | 33.5 | 33.9 | 2,000 | 20,000 | | |
| 30.8 | 35.2 | 34.0 | 2,000 | 20,000 | 1.3 | 27.7 |
| 32.6 | 33.2 | 34.2 | 2,000 | 20,000 | 18.2 | 5.1 |
| 32.9 | 33.0 | 34.1 | 2,000 | 20,000 | 476.4 | |
| 32.9 | 33.0 | 34.1 | 2,200 | 7,000 | 218.7 | >15.4 |

The monovariant ternary eutectic reaction is typically fulfilled when two of the binary systems are eutectiferous and the other is isomorphous, as generally described in the preceding material. However, this type of reaction may be extended to those systems whose space diagrams consist of a eutectic and two isomorphous systems and also to the case of the system containing a minimum in the liquidus between at least two of the components and a eutectic binary. Still further, systems involving a monotectic, an eutectic, and a continuous series of solid solutions in the third system may exhibit a trough involving the deposition of two solid phases simultaneously from the liquid. And the described systems are not inclusive. In any event, however, the common and distinguishing feature of the compositions contemplated herein is their solidification according to the monovariant eutectic reaction.

Further, while the alloys of the present invention are considered to be eutectic-type alloys in the sense that they generally exhibit structures similar to the directionally solidified eutectics as disclosed by Kraft, supra, it will be understood that slight deviations from the true monovariant eutectic composition may also be satisfactory. Those alloys which deviate slightly from the true eutectic compositions will normally be solidified into a microstructure with the desired anisotropy but which have distributed therein relatively large proeutectic crystals in a dispersion which may be random or uniform. Accordingly, those alloys which approximate the monovariant eutectic composition as described herein are intended to be encompassed by the terminology used even though they may in fact deviate slightly from the more preferred compositions.

Furthermore, while the various compositions have been described in the conventional manner as basic chemical elements or materials, those skilled in the art will understand that such materials will normally contain a variety of impurities in trace amounts. Typically, these impurities are either those associated with the occurrence of the basic elements in nature which, for economic reasons, are not completely removed in commercial practice; or those resultant from contamination in the various processing stages.

Similarly, it may in some instances be advantageous to intentionally add certain materials in minor amounts to the basic monovariant eutectic composition to impart a particular property or characteristic thereto. A number of ingredients are known to have a profound effect on the properties of materials even though present in a minor amount. Yttrium and the rare earth elements, for example, in quantities as low as 0.03 weight percent have been found to promote the formation of a dense and adhesive oxide on the nickel-chromium alloys. In some alloys quantities of boron, carbon and zirconium in amounts as low as 0.005 weight percent have been found to promote creep-rupture ductility or, in some cases, cause a pronounced reduction of the tendency of the material toward grain boundary oxidation. Since these and similar materials are usually included in such small amounts, their addition may in certain cases not only be tolerated but may well be advantageous. While indiscriminate or gross additions of foreign materials are not contemplated, minor additions of particular ingredients which do not interfere with the basic plane front solidification mechanism are contemplated within the scope of the present invention.

What has been described herein is a series of phase-reinforced eutectic or eutectic-like compositions in which the chemistry of the phases may be varied in order to provide the optimum characteristics or properties required in a given environment or application. While in most instances the particular alloys discussed herein have been conceived and tested for the purpose of determining their suitability for gas turbine engines applications, it will be understood that their utility is not so confined. Quite obviously, there are numerous other situations where the desired anisotropy of these composites will be of considerable importance in both structural and nonstructural uses. Accordingly, the invention in its broader aspects is not limited to the specific methods, compositions, and examples herein described but numerous modifications, alterations, and additions may be made thereto within the true spirit and scope of the invention as set forth in the appended claims.

We claim:

1. A cast anisotropic body comprising a monovariant ternary eutectic alloy segregated into a matrix phase and a dispersed phase, the dispersed phase consisting of a plurality of high strength fibers oriented in substantial alignment and integrally embedded in the matrix phase.

2. A body according to claim 1 wherein the matrix phase consists of a nickel-base or cobalt-base alloy.

3. A body according to claim 1 wherein the matrix phase consists of a nickel-base intermetallic.

4. A cast anisotropic composite of monovariant eutectic composition which comprises a matrix phase consisting of an alloy of cobalt or nickel, and a dispersed phase embedded therein in the form of high strength fibers oriented in substantial alignment over a major portion of the composite, the fibrous phase consisting essentially of a carbide selected from the group consisting of the carbides of niobium, tantalum, titanium, vanadium, zirconium, hafnium, chromium, cobalt, and mixed carbides thereof.

5. A cast article of monovariant eutectic composition having anisotropic properties comprising a fiber-strengthened composite consisting of a cobalt alloy matrix and an aligned fibrous phase consisting of a mixed carbide of the composition $(Cr,Co)_7C_3$.

6. As an article of manufacture, a unidirectionally-solidified casting of a composition which consists essentially of, by weight, 35–45 percent chromium, 2.2–2.6 percent carbon, balance essentially cobalt segregated into a cobalt alloy matrix phase and an ligned fibrous phase consisting essentially of a mixed carbide of the composition $(Cr,Co)_7C_3$.

7. A gas turbine engine component comprising an aligned fiber-strengthened composite casting having a nominal composition of about, by weight, 41 percent chromium, 2.4 percent carbon, balance essentialy cobalt.

8. A cast article of monovariant eutectic composition having anisotropic properties comprising a fiber-strengthened composite consisting of a nickel alloy matrix and an aligned fibrous phase consisting of a carbide of the composition $Cr_7C_3$.

9. A cast article of monovariant eutectic composition having anisotropic properties comprising a fiber-strengthened composite consisting of a nickel or cobalt alloy matrix and an aligned fibrous phase consisting of a carbide of the composition $M_7C_3$, where M is predominantly chromium.

10. As an article of manufacture, a unidirectionally-solidified casting having pronounced anisotropy and a chemistry which consists of nickel or cobalt and two face-centered cubic monocarbides selected from the group consisting of the monocarbides of niobium, tantalum, titanium, vanadium, zirconium and hafnium at about the monovariant ternary eutectic composition.

11. An article according to claim 10 which the two monocarbides are niobium monocarbide and titanium monocarbide.

12. As an article of manufacture, a unidirectionally-solidified casting having pronounced anisotropy and a composition consisting of cobalt, niobium monocarbide and titanium monocarbide, the total monocarbide content corresponding to about 10 percent by weight.

13. An article according to claim 12 in which the niobium monocarbide in the composition corresponds to about 8 percent by weight.

14. A cast anisotropic body comprising a monovariant eutectic alloy segregated into a matrix phase consisting essentially of an intermetallic phase, and a dispersed phase, the dispersed phase being integrally embedded in the matrix phase and consisting of a plurality of metallic fibers oriented in substantial alignment.

15. A body according to claim 14 wherein the intermetallic phase is principally nickel aluminide.

16. A body according to claim 15 wherein the metallic fibers consist principally of chromium.

17. As an article of manufacture, a unidirectionally-solidified casting consisting of an alloy of monovariant eutectic composition in the range of 29.8 atomic percent nickel-36.6 atomic percent aluminum-33.6 atomic percent chromium to 35.2 atomic percent nickel-29.1 atomic percent aluminum-35.7 atomic percent chromium segregated into a cobalt alloy matrix phase and an aligned fibrous phase consisting essentially of a mixed carbide of the composition $(Cr,Co)_7C_3$.

References Cited
UNITED STATES PATENTS

| | | | |
|---|---|---|---|
| 3,098,723 | 7/1963 | Micks | 29—183.5 |
| 3,124,452 | 3/1964 | Kraft | 75—135 |
| 3,194,656 | 7/1965 | Vordahl | 75—135 |

L. DEWAYNE RUTLEDGE, Primary Examiner

E. L. WEISE, Assistant Examiner

U.S. Cl. X.R.

75—135, 170, 171